US009209654B2

(12) United States Patent
Colannino et al.

(10) Patent No.: US 9,209,654 B2
(45) Date of Patent: Dec. 8, 2015

(54) METHOD AND APPARATUS FOR ENHANCING FLAME RADIATION

(71) Applicant: ClearSign Combustion Corporation, Seattle, WA (US)

(72) Inventors: Joseph Colannino, Bellevue, WA (US); Tracy A. Prevo, Seattle, WA (US); Igor A. Krichtafovitch, Kirkland, WA (US); Christopher A. Wiklof, Everett, WA (US)

(73) Assignee: CLEARSIGN COMBUSTION CORPORATION, Seattle, WA (US)

( * ) Notice: Subject to any disclaimer, the term of this patent is extended or adjusted under 35 U.S.C. 154(b) by 364 days.

(21) Appl. No.: 13/729,159

(22) Filed: Dec. 28, 2012

(65) Prior Publication Data

US 2013/0170090 A1 Jul. 4, 2013

Related U.S. Application Data

(60) Provisional application No. 61/582,239, filed on Dec. 30, 2011.

(51) Int. Cl.
| | | |
|---|---|---|
| *H01T 23/00* | (2006.01) | |
| *G03G 15/02* | (2006.01) | |
| *H05F 3/00* | (2006.01) | |
| *H01H 47/32* | (2006.01) | |
| *H02J 17/00* | (2006.01) | |
| *F23C 99/00* | (2006.01) | |
| *F23D 14/00* | (2006.01) | |

(52) U.S. Cl.
CPC ............... *H02J 17/00* (2013.01); *F23C 99/001* (2013.01); *F23D 14/00* (2013.01)

(58) Field of Classification Search
CPC ........... F23N 5/00; H01T 23/00; F23D 14/68; F23C 99/001; H02J 17/00
USPC .................... 361/225, 226, 229–231; 431/8, 2
See application file for complete search history.

(56) References Cited

U.S. PATENT DOCUMENTS

| 1,153,182 | A | | 9/1915 | Schniewind |
| 2,604,936 | A | | 7/1952 | Kaehni et al. |
| 3,087,472 | A | | 4/1963 | Asakawa |
| 3,224,485 | A | | 12/1965 | Blomgren et al. |
| 3,306,338 | A | * | 2/1967 | Wright et al. ................. 431/202 |

(Continued)

FOREIGN PATENT DOCUMENTS

WO     WO 96/01394     1/1996

OTHER PUBLICATIONS

PCT International Search Report and Written Opinion of PCT Application No. PCT/US2012/072168 mailed on Mar. 18, 2013.

(Continued)

*Primary Examiner* — Stephen W Jackson
*Assistant Examiner* — Christopher Clark
(74) *Attorney, Agent, or Firm* — Christopher A. Wiklof; Nicholas S. Bromer; Launchpad IP, Inc.

(57) ABSTRACT

An apparatus for enhancing flame radiation includes a flame charging system and an electrically isolated electrode. A time-varying voltage is applied to the flame charging system and the flame charging system imparts a corresponding time-varying charge or time-varying voltage onto the flame. The flame responds to the time-varying charge or voltage by increasing its luminosity.

63 Claims, 4 Drawing Sheets

(56) References Cited

U.S. PATENT DOCUMENTS

| | | | |
|---|---|---|---|
| 3,358,731 A | 12/1967 | Donnelly | |
| 3,416,870 A * | 12/1968 | Wright | 431/2 |
| 3,503,348 A | 3/1970 | Dvirka | |
| 3,749,545 A | 7/1973 | Velkoff | |
| 3,841,824 A | 10/1974 | Bethel | |
| 3,869,362 A | 3/1975 | Machi et al. | |
| 4,052,139 A | 10/1977 | Paillaud et al. | |
| 4,091,779 A | 5/1978 | Saufferer et al. | |
| 4,093,430 A | 6/1978 | Schwab et al. | |
| 4,110,086 A | 8/1978 | Schwab et al. | |
| 4,111,636 A | 9/1978 | Goldberg | |
| 4,118,202 A | 10/1978 | Scholes | |
| 4,219,001 A | 8/1980 | Kumagai et al. | |
| 4,260,394 A | 4/1981 | Rich | |
| 4,291,539 A | 9/1981 | Potter | |
| 4,304,096 A | 12/1981 | Liu et al. | |
| 4,340,024 A | 7/1982 | Suzuki et al. | |
| 4,439,980 A | 4/1984 | Biblarz et al. | |
| 4,649,260 A | 3/1987 | Melis et al. | |
| 4,675,029 A | 6/1987 | Norman et al. | |
| 4,903,616 A | 2/1990 | Mavroudis | |
| 4,987,839 A | 1/1991 | Krigmont et al. | |
| 4,995,805 A | 2/1991 | Hilliard | |
| 5,129,223 A | 7/1992 | Doelner | |
| 5,702,244 A | 12/1997 | Goodson et al. | |
| 5,737,674 A | 4/1998 | Venkatesan et al. | |
| 6,002,573 A * | 12/1999 | Partridge | 361/231 |
| 6,640,549 B1 | 11/2003 | Wilson et al. | |
| 6,736,133 B2 | 5/2004 | Bachinski et al. | |
| 6,742,340 B2 | 6/2004 | Nearhoof, Sr. et al. | |
| 6,918,755 B1 | 7/2005 | Johnson et al. | |
| 7,137,808 B2 * | 11/2006 | Branston et al. | 431/8 |
| 7,168,427 B2 | 1/2007 | Bachinski et al. | |
| 7,182,805 B2 | 2/2007 | Reaves | |
| 7,226,496 B2 | 6/2007 | Ehlers | |
| 7,226,497 B2 | 6/2007 | Ashworth | |
| 7,243,496 B2 * | 7/2007 | Pavlik et al. | 60/776 |
| 7,377,114 B1 | 5/2008 | Pearce | |
| 7,523,603 B2 | 4/2009 | Hagen et al. | |
| 7,845,937 B2 * | 12/2010 | Hammer et al. | 431/2 |
| 7,927,095 B1 | 4/2011 | Chorpening et al. | |
| 8,082,725 B2 | 12/2011 | Younsi et al. | |
| 8,245,951 B2 | 8/2012 | Fink et al. | |
| 2004/0185397 A1 * | 9/2004 | Branston et al. | 431/2 |
| 2005/0170301 A1 | 8/2005 | Pavlik et al. | |
| 2005/0208442 A1 | 9/2005 | Heiligers et al. | |
| 2006/0165555 A1 | 7/2006 | Spielman et al. | |
| 2007/0020567 A1 * | 1/2007 | Branston et al. | 431/8 |
| 2008/0145802 A1 * | 6/2008 | Hammer et al. | 431/2 |
| 2009/0274860 A1 | 11/2009 | Ebina et al. | |
| 2010/0173495 A1 | 7/2010 | Thakur et al. | |
| 2010/0183424 A1 | 7/2010 | Roy | |
| 2011/0027734 A1 | 2/2011 | Hartwick et al. | |
| 2011/0072786 A1 | 3/2011 | Tokuda et al. | |
| 2011/0203771 A1 | 8/2011 | Goodson et al. | |
| 2012/0317985 A1 * | 12/2012 | Hartwick et al. | 60/722 |
| 2013/0004902 A1 | 1/2013 | Goodson et al. | |
| 2013/0071794 A1 | 3/2013 | Colannino et al. | |
| 2013/0170090 A1 | 7/2013 | Colannino et al. | |
| 2013/0230810 A1 | 9/2013 | Goodson et al. | |
| 2013/0230811 A1 | 9/2013 | Goodson et al. | |
| 2013/0255482 A1 | 10/2013 | Goodson | |
| 2013/0255548 A1 | 10/2013 | Goodson et al. | |
| 2013/0255549 A1 | 10/2013 | Sonnichsen et al. | |
| 2013/0260321 A1 | 10/2013 | Colannino et al. | |

OTHER PUBLICATIONS

Altendrfner et al., "Electric Field Effects on Emissions and Flame Stability With Optimized Electric Field Geometry", Third European Combustion Meeting ECM 2007, p. 1-6.

William T. Brande; "The Bakerian Lecture: On Some New Electro-Chemical Phenomena", Phil. Trans. R. Soc. Lond. 1814 104, p. 51-61.

James Lawton and Felix J. Weinberg. "Electrical Aspects of Combustion". Clarendon Press, Oxford. 1969.

James Lawton et al., Electrical Aspects of Combustion, 1969, p. 81, Clarendon Press, Oxford, England.

Timothy J.C. Dolmansley et al., Electrical Modification of Combustion and the Affect of Electrode Geometry on the Field Produced, Modelling and Simulation in Engineering, May 26, 2011, 1-13, vol. 2011, Himdawi Publishing Corporation.

F. Altendorfner et al., Electric Field Effects on Emissions and Flame Stability with Optimized Electric Field Geometry, The European Combustion Meeting ECM 2007, 2007, 1-6, Germany.

* cited by examiner

METHOD AND APPARATUS FOR ENHANCING FLAME RADIATION

CROSS REFERENCE TO RELATED APPLICATIONS

The present application claims priority benefit from U.S. Provisional Patent Application No. 61/582,239, entitled "METHOD AND APPARATUS FOR ENHANCING FLAME RADIATION", filed Dec. 30, 2011; which, to the extent not inconsistent with the disclosure herein, is incorporated by reference.

BACKGROUND

In some boiler and burner designs, it may be desirable to transfer at least a portion of combustion energy as radiated energy. However, some types of flames are poorly radiating. In some cases, heat is radiated by flame impinging on a higher-emissivity refractory surface. However, this is not possible in all furnaces. Even when refractory walls can be used, hard refractory walls add weight and cost to furnace installations.

Fuels with a relatively high C/H atomic ratio, e.g., heavy fuel oils and coal, may be used to produce relatively high emissivity flames. However, these fuels are also prone to higher particulate and carbon monoxide (CO) emissions.

Cleaner burning fuels such as natural gas exhibit relatively poor heat transfer via thermal radiation owing to low emissivity of their flames.

What is needed is a technology that can transform a poorly radiating flame into a highly radiating flame. Better radiant heat transfer can reduce the size of a furnace. Furnace size is a significant component of overall reactor or heater cost. Such a technology could reduce the overall size, weight, and cost of new furnaces and increase the throughput of existing furnaces and processes driven by furnaces. Additionally, such a technology would desirably be switchable to allow for rapid heating and cooling cycles not possible with designs having high thermal mass. Moreover, such a technology would desirably offer directed radiation difficult or impossible to achieve with high thermal mass, intermediate radiator approaches.

SUMMARY

It was found in laboratory testing that the application of alternating electrical energy a low emissivity flame greatly increases flame emissivity.

According to an embodiment, a system for radiating energy from a flame, such as a hydrocarbon flame, may include a flame charging system configured to receive a time-varying voltage and impart a corresponding time-varying charge or voltage onto the flame. The flame charging system may have at least intermittent contact with the flame, and may be embodied as a portion of a fuel nozzle, flame holder, or discrete electrode past which the flame is directed, may include an ion-ejecting electrode, or may include an ionizer. An electrically isolated conductor may be located proximate the flame. The electrically isolated conductor may be arranged to be in electromagnetic communication with the time-varying charge imparted onto the flame, and may be configured to interact with the time-varying charge of the flame to increase radiated thermal energy.

According to another embodiment, a method for radiating energy from a hydrocarbon flame may include providing a hydrocarbon fuel, igniting the hydrocarbon fuel to produce a flame, energizing the flame with a time-varying voltage or charge, and supporting an isolated electrical conductor adjacent to the flame to cause the flame to emit enhanced visible or infrared light energy. The electrically isolated conductor may be arranged to be in electromagnetic communication with the time-varying voltage or charge imparted onto the flame to cause the increased radiated thermal energy.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 1:
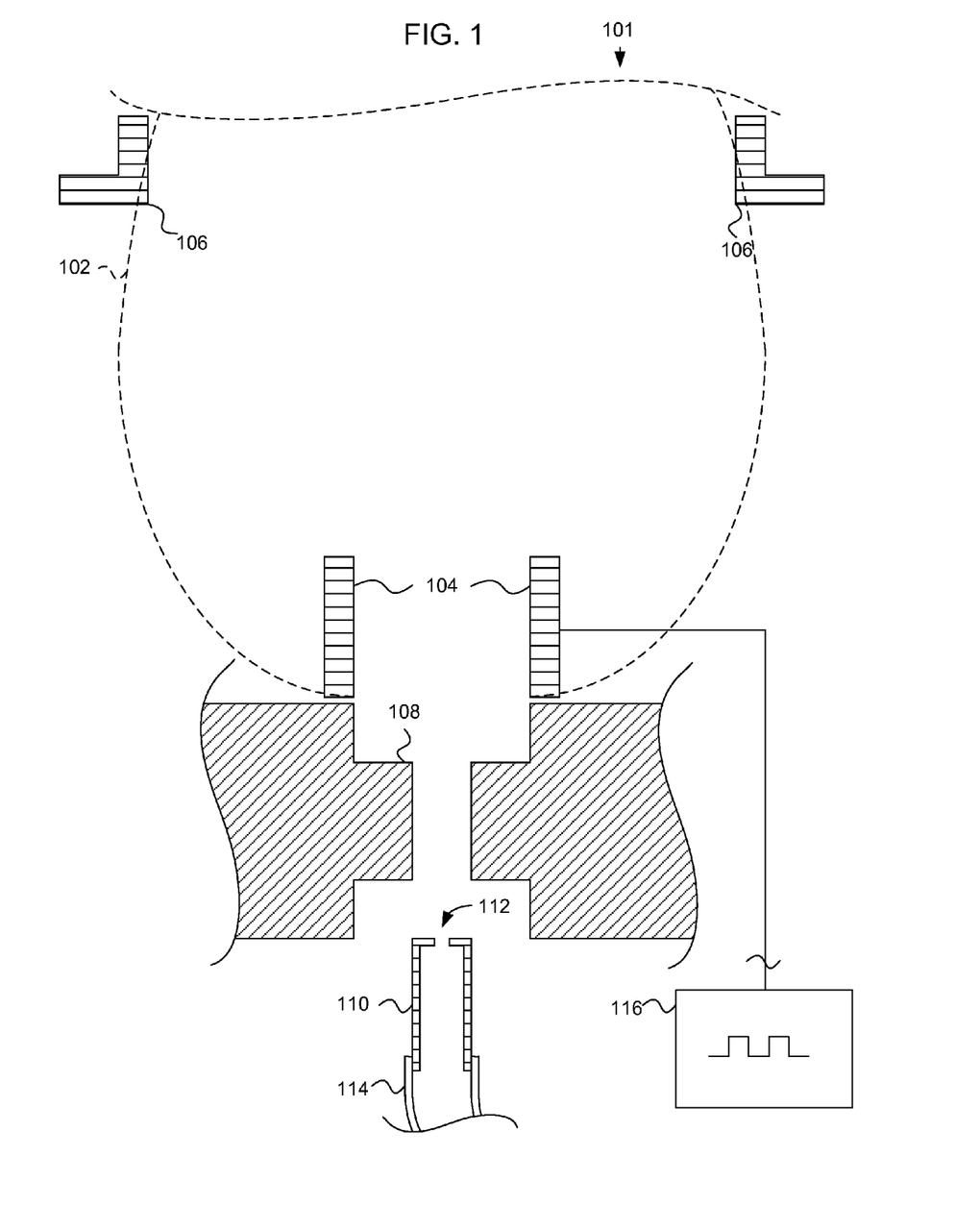
FIG. 1 is a diagram illustrating a system for radiating energy from a flame, according to an embodiment.

FIG. 1 is a diagram illustrating a system 101 for radiating energy from a flame 102, according to an embodiment. In the system 101, a flame charging system 104 may be configured to receive a time-varying voltage and impart a corresponding time-varying charge or voltage onto a hydrocarbon flame 102. An electrically isolated conductor 106 proximate the flame 102 was found to interact with the time-varying charge of the flame 102 to cause the flame 102 to change in appearance from being substantially transparent to being bright yellow. It was concluded that the electrically isolated conductor 106 may be arranged to be in electrical communication with the time-varying charge imparted onto the hydrocarbon flame 102. The change in flame appearance was believed to correspond to an increase in emissivity of heated species within the flame.

The flame charging system 104 may include a flame energization electrode having at least intermittent contact with the flame 102. The flame charging system 104 may be configured to receive a time-varying voltage selected to cause the flame energization electrode to impart the corresponding time-varying electrical charge or voltage onto the flame. An energization electrode may operate by conduction of voltage from the energization electrode to the flame.

Additionally or alternatively, the flame charging system may include a charge-ejecting electrode disposed proximate to the flame. The charge-ejecting electrode may be configured to receive a time-varying voltage and to eject a corresponding time-varying electrical charge toward the flame. The charge-ejecting electrode may be referred to as a corona electrode. The charge-ejecting electrode may include a sharp electrode.

Additionally or alternatively, the flame charging system may include an ionizer configured to receive a time-varying voltage and provide a fluid medium carrying corresponding time-varying electrical charge or voltage to or in proximity to the flame. For example, the ionizer may be configured to impart the time-varying electrical charges onto a fuel. Additionally or alternatively, the ionizer may be configured to impart the time-varying electrical charges onto combustion air. Additionally or alternatively, the ionizer may be configured to impart the time-varying electrical charges onto one or more types of charge carriers and to deliver the one or more types of charge carriers to the combustion reaction.

According to an interpretation, a phase-varying electrical energy interchange between the time-varying charge of the flame 102 and the electrically isolated conductor 106 may correspond to an increase in the formation of carbon molecules or carbon agglomerations in the flame 102. The carbon molecules or carbon agglomerations in the flame may incandesce and increase the emissivity of the flame. No increase in soot output from the flame 102 was seen. According to embodiments, the resultant increase in radiation from the flame 102 may be used to increase radiation heat transfer to an apparatus or workpiece.

The system 101 may further include a flame holder 108 configured to anchor the flame 102. The flame holder 108 may be electrically isolated or an electrical insulator. A fuel source 110 such as a hydrocarbon gas fuel source including a nozzle or hole 112 may be configured to stream the hydrocarbon gas past the flame holder 108. The hydrocarbon gas fuel source may include an electrically insulating pipe or hose 114 configured to electrically isolate the nozzle or hole 112 from a relative ground.

A time-varying voltage source 116 may provide a modulated voltage to the flame charging system 104. For example, the time-varying voltage source 116 may include a microcontroller, field-programmable gate array (FPGA), application specific integrated circuit (ASIC), state machine, integrated circuits, and/or discrete circuitry to output a waveform. The time-varying voltage source 116 may further be configured to select the waveform responsive to open-loop logic and/or feedback from a sensor circuit (not shown). The time-varying voltage source 116 may further include an amplifier configured to receive the waveform and output the time-varying voltage. The flame charging system may include a flame energization electrode 104 arranged to be in substantially continuous contact with the flame 102 when the flame 102 is burning. The time varying voltage and a geometry of the flame energization electrode 104 may be selected to substantially prevent formation of an electrical arc.

The time-varying voltage may be selected to cause a phase-varying electrical energy interchange between the flame 102 and the electrically isolated conductor 106. According to an explanation, the electrically isolated conductor 106 may be arranged in a capacitive relationship with the time-varying charge imparted onto the flame. For example, the time-varying voltage may be selected to cause a phase-varying capacitive energy storage between the flame 102 and the electrically isolated conductor 106. Additionally or alternatively, the electrically isolated conductor 106 may be arranged in an inductive relationship with the time-varying charge imparted onto the flame 102. For example, the time-varying voltage may be selected to cause a phase-varying inductive energy storage or a combined inductive-capacitive energy storage between the flame 102 and the electrically isolated conductor 106.

Additionally or alternatively, the time-varying voltage may be selected to cause a phase-varying local transition state concentration and/or charge balance in the flame. According to an embodiment, the phase-varying electrical energy interchange or phase-varying local transition state concentration and/or charge balance may correspond to a decrease in an average flame temperature. The decrease in average flame temperature may be viewed as an outcome of a time-varying rate of reaction and/or as an outcome of radiating more energy from the flame 102.

The electrically isolated conductor 106 was found to operate as described when configured as a steel ring. According to embodiments, the electrically isolated conductor may include a ring or ring segment at least partially surrounding the flame. The electrically isolated conductor 106 may be arranged to be substantially coaxial to the flame.

The electrically isolated conductor 106 was found to operate as described when it was in substantially continuous physical contact with the flame. According to another embodiment, the electrically isolated conductor 106 may occasionally or intermittently come into physical contact with the flame. "Physical contact" may be defined as visual contact with a flame edge.

An arrangement corresponding to 101 was operated using a hydrocarbon gas flame 102 produced by combustion of propane. Other fuels may alternatively or additionally be burned and/or other reduction-oxidation reactions may be supported to operate as described. For example, the hydrocarbon may include greater than or fewer than three carbon atoms. Other illustrative hydrocarbon fuels may include natural gas, ethane, butane, liquefied petroleum gases, refinery gas or liquid mixtures, gasoline, diesel, fuel oil, coal, etc.

Figure 2:
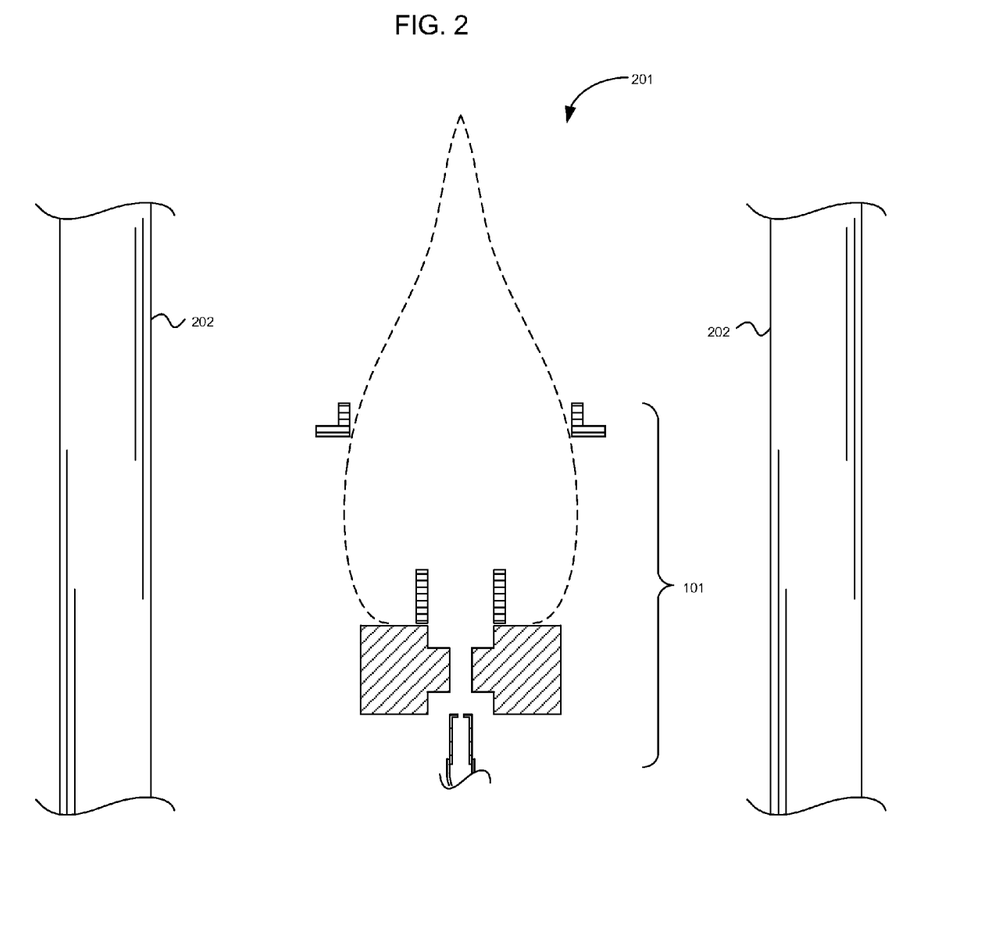
FIG. 2 is a diagram illustrating the system of FIG. 1 in relation to a system including a heat transfer surface, according to an embodiment.

FIG. 2 is a diagram illustrating the system 101 of FIG. 1 in relationship to a system 201 including a heat transfer surface 202, according to an embodiment. Accordingly, embodiments may include a surface 202 configured to receive radiant energy from the flame 102. For example, the surface 202 may comprise a portion of an industrial process 201 configured to receive radiant energy from the flame 102, a heating system 201 configured to receive radiant energy from the flame 102, an electrical power generation system 201 configured to receive radiant energy from the flame 102, a land vehicle, watercraft, or aircraft including an apparatus 201 configured to receive radiant energy from the flame 102, and/or a structure (not shown) configured to hold a workpiece 202 to receive radiant energy from the flame 102.

Figure 3:
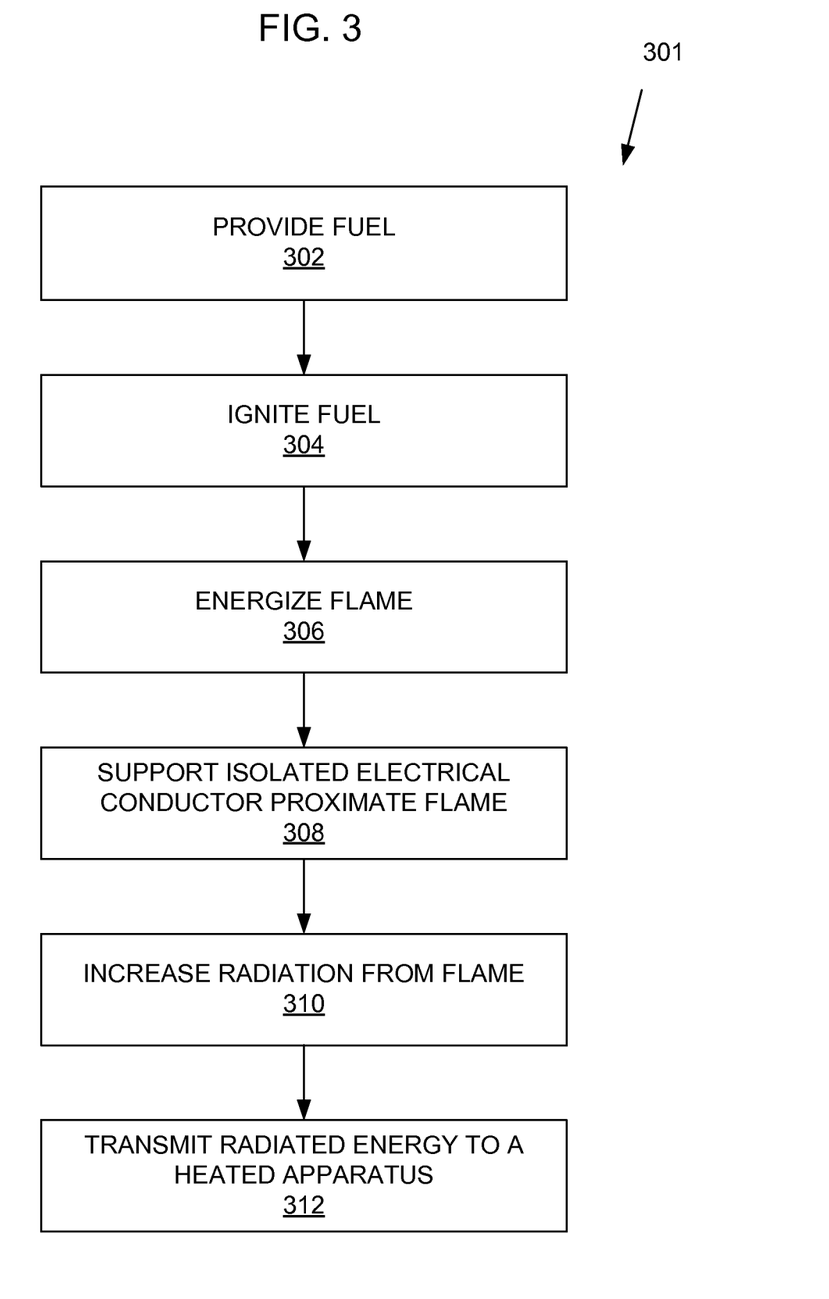
FIG. 3 is a flow chart showing a method for increasing radiation from a flame, according to an embodiment.

FIG. 3 is a flow chart showing a method 301 for increasing radiation from a flame, according to an embodiment. Beginning at step 302, a fuel may be provided. For example, providing a fuel may include providing a hydrocarbon fuel. Such a hydrocarbon fuel may have one to three carbon atoms per molecule, or may have more atoms per molecule. While various embodiments may include increasing radiation output of flames produced by combusting other fuels, low molecular weight hydrocarbon gas fuels are illustratively addressed because such fuels typically produce flames that are substantially transparent, owing to low emissivity of the gas and the reaction intermediates, and thus may particularly benefit from methods described herein. According to embodiments, the method 301 may be used to increase thermal radiation from a natural gas flame.

Proceeding to step 304, the hydrocarbon fuel may be ignited to produce a flame. The method 301 may include premixing air or other oxidizer and the fuel (not shown). In some embodiments, the flame may include or be a diffusion flame.

In step 306, the flame may be energized with a time-varying voltage or electrical charge. Energizing the flame with a time-varying voltage or electrical charge may include driving a first electrode near or at least partially in the flame with a corresponding time varying voltage. According to embodiments, energizing the flame with a time-varying voltage or electrical charge may include driving a fuel nozzle or a flame holder with a corresponding time varying voltage. Additionally or alternatively, energizing the flame with a time-varying voltage or electrical charge may include driving an ionizer with the time-varying voltage to create the corresponding time-varying electrical charge. Additionally or alternatively, energizing the flame with a time-varying voltage or electrical charge may include driving an ion-ejecting electrode with the time-varying voltage to eject ions corresponding time-varying voltage or electrical charge toward or onto the flame.

Various voltage waveforms, amplitudes, and frequencies were used in experiments, and others have been hypothesized. It is believed that a relatively wide range and combination of parameters may be used to increase radiation emissions from the flame. According to embodiments, energizing the flame with a time-varying voltage may include energizing the flame with a periodically-varying voltage at 50 to 10,000 hertz frequency. For example, the flame may be energized with a periodically-varying voltage at a 50-1000 hertz frequency. It was noted during experiments that a 400 hertz frequency resulted in a larger amount of radiated energy than did a 50 hertz frequency, other parameters being equal.

Waveforms may similarly be varied. For example, energizing the flame with a time-varying voltage may include energizing the flame with a square wave, sawtooth wave, sine wave or other waveform. It was noted during experiments that a square wave resulted in a larger shift to radiated energy than did a sinusoidal waveform, other parameters being equal.

Similarly, voltage and geometry may be varied. According to embodiments, energizing the flame with a time-varying voltage may include energizing the flame with a 1000 volt to 115,000 volt amplitude. For example, the voltage may be between 8000 to 40,000 volt amplitude. It is believed that larger flames may respond favorably to larger voltages.

Step 306 may further include providing a flame energization geometry or control circuitry to substantially prevent arcing. For example, the flame energization voltage may be alternated or applied in such a way as to not exceed the breakdown voltage of the ambient environment or the flame. Exceeding the breakdown voltage will produce an electrical spark in a phenomenon known as arcing. One approach for reducing arcing may be to smooth all edges of the first electrode to avoid charge concentrations that may tend to initiate an arc. Another approach may be to control voltage with sufficient accuracy to avoid voltage spikes that may initiate an arc. Another approach may be to use a feedback circuit in combination with a current limiting power supply to cut power upon sensing arcing or incipient arcing conditions.

Proceeding to step 308, an electrical conductor may be supported adjacent to the gas flame to cause the flame to emit enhanced visible and/or infrared light energy. An example electrical conductor 106 may be seen in FIG. 1. The electrical conductor may, for example, be in electrical continuity with ground through a resistance greater than about one mega-ohm and/or may be insulated or isolated from ground. Use of a high resistance to ground and/or isolation of the electrical conductor may allow the electrical conductor to electrically float.

Various theories may help explain the behavior described herein. For example, the electrical conductor may be in capacitive communication with the energized flame. Alternatively or additionally, the electrical conductor may be in inductive communication with the energized flame. The flame emission behavior described herein may involve a periodic energy exchange between capacitance and/or inductance and thermal energy of the flame. Additionally or alternatively, the electrical conductor may operate in combination with the modulated, time-varying charge on the flame to reduce the concentration of a transition state due to removal of one sign of charge during one half-cycle, and then act as a source of some or all of the sign of charge and local reaction transition state concentration during the subsequent half-cycle. Since soot is electrically conductive and soot particles can concentrate electrical fields, an external electrical field may increase the precipitation of soot from a flame. Ionic mechanisms of soot formation have been postulated in the literature, but no mention of external fields has been previously suggested. According to embodiments, the time-varying voltage may be selected to cause an increase in an incandescing soot fraction of the flame.

An explanation of these alternative or complementary theories may be understood by reference to FIG. 4, below.

According to embodiments, the electrical conductor may include a ring surrounding an upper portion of the flame and not in contact with the flame.

Responsive to one or more interactions between the electrical conductor adjacent to the flame and the flame energization electrode, the flame may emit enhanced visible and/or infrared light energy, shown as step 310. According to one explanation, interactions between the charge on the flame and the conductor may cause the flame to emit enhanced visible or infrared light energy responsive increasing the emissivity of reaction products and reaction intermediates in the flame. For example, increasing radiation from the flame may include shifting a reaction path to at least temporarily produce soot. The soot may emit black body radiation corresponding to the flame temperature.

Proceeding to step 312, at least a portion of the radiated energy may be transmitted at to an apparatus.

Figure 4:
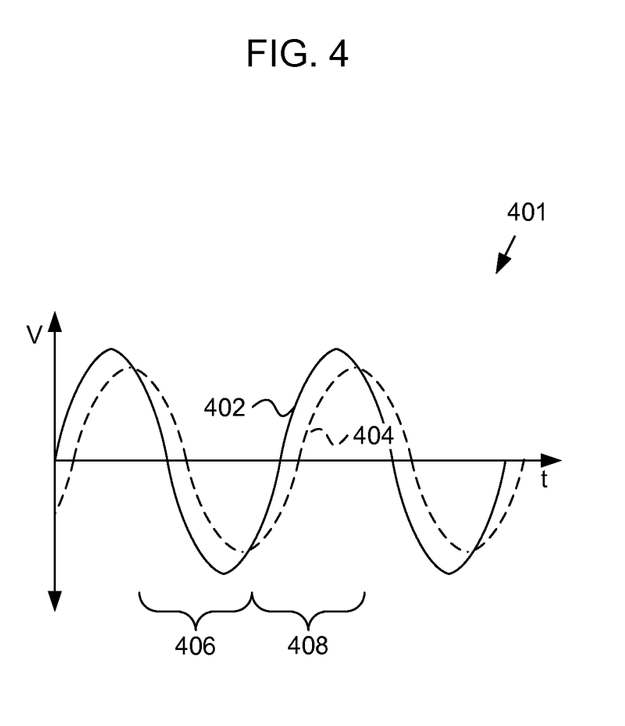
FIG. 4 is a diagram illustrating a theory explaining the behavior of the methods and systems described in conjunction with FIGS. 1-3, according to an embodiment.

FIG. 4 is a diagram 401 illustrating a theory explaining the behavior of the methods and systems described in conjunction with FIGS. 1-3, according to an illustrative embodiment. In the diagram 401, voltage, V, is plotted as a function of time, t. A first voltage waveform 402, shown as a solid line approximating a sine wave, may correspond to a time-varying voltage applied to the first electrode described above. When the conductor is allowed to float, its voltage may be described by a phase-shifted waveform 404, shown as a dashed line. As a voltage 402 applied to the first electrode increases, the voltage of the conductor 404 may follow.

During a first half cycle 406 of the system, the voltage applied to the flame 402 may lower than the voltage 404 responsively held by the conductor. During the half cycle 406, electrons may be attracted out of at least portions of the flame toward the conductor. Similarly, positively charged species may be attracted from proximity to the conductor to the flame. Because the charge to mass ratio of electrons is so much larger than the charge to mass ratio of positive species present in the flame, the movement of electrons may be responsible for most or substantially all of the effects described herein. The effect of the attraction of electrons out of the flame may be viewed in several ways. Remaining positive charges may unbalance the local population of transition states (excited molecules and intermediates) or charges. The positive charge imbalance may tend to be associated with carbon molecules or agglomerations, which hold heat produced during the previous half-cycle, and emit the heat as radiation. According to a second view, some of the energy of the system may be temporarily converted to a capacitive and/or inductive energy held in a field between the flame and the conductor.

During a second half cycle 408 of the system, the voltage applied to the flame 402 may be higher than the voltage 404 responsively held by the conductor. During the half cycle 408, electrons may be attracted from proximity to the conductor and into the flame. During the second half cycle 408, the concentration of transition states and/or the charge balance the combustion reaction may again be satisfied, causing carbon molecules or agglomerations to be consumed. According to the second view, energy may be extracted from a capacitive and/or inductive energy field to be expressed as heat energy in the flame.

Other theories may also explain the effects described herein. For example, it is possible that an increased rate of reaction is provided simply by mixing forces as charged species stream past and collide with complementary species. A reduced rate of reaction may then be seen during portions of the cycle where the reactant velocities stagnate and reverse direction.

Notwithstanding particular mechanisms which may cause the described behavior, the behavior described and claimed herein was observed experimentally, as may be illustrated by the following example(s).

EXAMPLES

Example 1

Referring to FIG. 1, in a control experimental apparatus variant that did not include the conductor 106, a propane gas flame continued to burn substantially transparently when a voltage was applied to the energization electrode 104.
Geometry:
Energization Electrode 104:
A 3-inch nominal diameter steel pipe was cut to a length of 3¾ inches. The energization electrode 104 was positioned about 16 inches above a 0.775-inch diameter hole 112.
Conductor 106:
Absent.
Fuel Source 110:
A 0.775-inch diameter hole 112 was formed in a threaded ¾-inch steel pipe end. The threaded steel end was mounted on piece of ¾-inch steel pipe about 8 inches in length. A non-conductive hose 114 was secured to an upstream end of the fuel pipe 110. Propane was supplied at a pressure of about 8 PSIG.
Energization:
A time-varying voltage was applied as a square wave at a frequency of 50-1000 Hz. An indicated voltage of 2-8V was indicated by a National Instruments PXI-5412 waveform generator mounted in a National Instruments NI PXIe-1062Q chassis. The waveform was amplified 4000× by a TREK Model 40/15 high voltage amplifier to produce a time-varying relative driving voltage range of 8000 V to 32000 V at the energization electrode 104.
Observations:
There was no visible flame difference responsive to the applied time-varying voltage.

Example 2

Referring again to FIG. 1, an experimental apparatus 101 included an ungrounded 6 inches steel pipe flange as the conductor 106. The pipe flange 106 was supported by refractory bricks concentric to and at a height of 8 inches above the bottom edge of the energization electrode 104.

The energization electrode 104 was again energized according to the parameters given above.

The apparatus 101 produced a much yellower and surging flame. The brightness of the light output was greater when the energization electrode 104 was driven with a square wave at 1000 Hz than a square wave driven at the same voltage at 50 Hz.

The gap between the top of the energization electrode 104 and the bottom of the ring 106 was 4¼" axially. Adding a second ring 106 on top of the first ring 106 gave no noticeable increase in brightness. If anything, adding a second ring diminished the brightness somewhat.

Blue tendrils were noted between the hole 112 and the flame holder 108 when a voltage waveform was applied to the energization electrode 104 in the presence of the ring 106. No blue tendrils were seen when voltage was applied in the absence of the ring 106. Electrical isolation of the pipe 110 from ground was measured. Some leakage to ground was found, but very little.

Example 3

The apparatus of EXAMPLE 2 was modified by grounding the ring 106. Upon application of the energization voltage, a very brief increase in flame luminosity was noted. The flame did not exhibit any sustained increase in luminosity.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A system for radiating energy from a hydrocarbon flame, comprising:
a flame charging system configured to impart a time-varying electrical charge or voltage onto a hydrocarbon gas flame; and
an electrically isolated conductor proximate the flame.

2. The system for radiating energy from a hydrocarbon flame of claim 1, wherein the flame charging system includes an energization electrode having at least intermittent contact with the flame and configured to receive a time-varying voltage.

3. The system for radiating energy from a hydrocarbon flame of claim 2, wherein the time-varying voltage is selected to cause the flame charging system to impart the corresponding time-varying electrical charge or voltage onto the flame.

4. The system for radiating energy from a hydrocarbon flame of claim 1, wherein the flame charging system includes a charge-ejecting electrode disposed proximate to the flame; and
wherein the charge-ejecting electrode is configured to receive a time-varying voltage and to eject a corresponding time-varying electrical charge toward the flame.

5. The system for radiating energy from a hydrocarbon flame of claim 4, wherein the charge-ejecting electrode includes a corona electrode.

6. The system for radiating energy from a hydrocarbon flame of claim 4, wherein the charge-ejecting electrode includes a sharp electrode.

7. The system for radiating energy from a hydrocarbon flame of claim 1, wherein the flame charging system includes an ionizer configured to receive a time-varying voltage and provide a fluid medium carrying corresponding time-varying electrical charges to or in proximity to the flame.

8. The system for radiating energy from a hydrocarbon flame of claim 7, wherein the ionizer is configured to impart the time-varying electrical charges onto a fuel.

9. The system for radiating energy from a hydrocarbon flame of claim 7, wherein the ionizer is configured to impart the time-varying electrical charges onto combustion air.

10. The system for radiating energy from a hydrocarbon flame of claim 7, wherein the ionizer is configured to impart the time-varying electrical charges onto one or more types of charge carriers and to deliver the one or more types of charge carriers to the combustion reaction.

11. The system for radiating energy from a hydrocarbon flame of claim 1, wherein, upon receipt of the time-varying charge, the flame changes in appearance from being substantially transparent to being bright yellow.

12. The system for radiating energy from a hydrocarbon flame of claim 1, wherein the electrically isolated conductor is arranged to be in electrical communication with the time-varying charge imparted onto the hydrocarbon gas flame.

13. The system for radiating energy from a hydrocarbon flame of claim 12, wherein the electrically isolated conductor is arranged in a capacitive relationship with the time-varying charge imparted onto the flame.

14. The system for radiating energy from a hydrocarbon flame of claim 13, wherein the time-varying voltage is selected to cause an electrical waveform phase-varying capacitive energy storage between the flame and the electrically isolated conductor.

15. The system for radiating energy from a hydrocarbon flame of claim 14, wherein the electrically isolated conductor is arranged in an inductive relationship with the time-varying charge imparted onto the flame.

16. The system for radiating energy from a hydrocarbon flame of claim 15, wherein the time-varying voltage is selected to cause an electrical waveform phase-varying inductive energy storage between the flame and the electrically isolated conductor.

17. The system for radiating energy from a hydrocarbon flame of claim 1, wherein the time-varying voltage is selected to cause an electrical waveform phase-varying electrical energy interchange between the flame and the electrically isolated conductor.

18. The system for radiating energy from a hydrocarbon flame of claim 1, wherein the time-varying voltage is selected to cause a time-varying local transition state concentration or charge balance in the flame.

19. The system for radiating energy from a hydrocarbon flame of claim 1, wherein the time-varying voltage is selected to cause an increase of an incandescing soot fraction of the flame.

20. The system for radiating energy from a hydrocarbon flame of claim 1, wherein a phase-varying electrical energy interchange or a phase-varying local transition state concentration or charge balance corresponds to a decrease in an average flame temperature.

21. The system for radiating energy from a hydrocarbon flame of claim 20, wherein the phase-varying electrical energy interchange or a phase-varying local transition state concentration or charge balance corresponds to an increase in the formation of carbon molecules or carbon-containing agglomerations in the flame; and
wherein the carbon molecules or carbon-containing agglomerations in the flame increase the emissivity of the flame.

22. The system for radiating energy from a hydrocarbon flame of claim 1, wherein the flame charging system is arranged to be in substantially continuous contact with the flame when the flame is burning.

23. The system for radiating energy from a hydrocarbon flame of claim 1, wherein the time-varying voltage and a geometry of the flame charging system are selected to substantially prevent formation of an electrical arc.

24. The system for radiating energy from a hydrocarbon flame of claim 1, wherein the electrically isolated conductor includes a ring or ring segment at least partially surrounding the flame.

25. The system for radiating energy from a hydrocarbon flame of claim 1, wherein the electrically isolated conductor is in at least intermittent contact with the flame.

26. The system for radiating energy from a hydrocarbon flame of claim 1, wherein the electrically isolated conductor is arranged substantially coaxial to the flame.

27. The system for radiating energy from a hydrocarbon flame of claim 1, further comprising:
a flame holder configured to anchor the flame.

28. The system for radiating energy from a hydrocarbon flame of claim 27, wherein the flame holder is electrically isolated or an electrical insulator.

29. The system for radiating energy from a hydrocarbon flame of claim 27, further comprising:
a hydrocarbon gas fuel source including a nozzle or hole configured to stream the hydrocarbon gas past the flame holder.

30. The system for radiating energy from a hydrocarbon flame of claim 29, wherein the hydrocarbon gas fuel source includes an electrically insulating pipe or hose configured to electrically isolate the nozzle or hole from a relative ground.

31. The system for radiating energy from a hydrocarbon flame of claim 1, wherein the hydrocarbon fuel includes a gaseous hydrocarbon fuel.

32. The system for radiating energy from a hydrocarbon flame of claim 31, wherein the hydrocarbon fuel includes one to three atoms per molecule.

33. The system for radiating energy from a hydrocarbon flame of claim 1, further comprising:
a surface configured to receive radiant energy from the flame.

34. The system for radiating energy from a hydrocarbon flame of claim 1, further comprising:
an industrial process configured to receive radiant energy from the flame.

35. The system for radiating energy from a hydrocarbon flame of claim 1, further comprising:
a heating system configured to receive radiant energy from the flame.

36. The system for radiating energy from a hydrocarbon flame of claim 1, further comprising:
an electrical power generation system configured to receive radiant energy from the flame.

37. The system for radiating energy from a hydrocarbon flame of claim 1, further comprising:
a land vehicle, watercraft, or aircraft including an apparatus configured to receive radiant energy from the flame.

38. The system for radiating energy from a hydrocarbon flame of claim 1, further comprising:
a structure configured to hold a workpiece to receive radiant energy from the flame.

39. A method for radiating energy from a flame, comprising:
providing a hydrocarbon fuel;
igniting the hydrocarbon fuel to produce a flame;
energizing the flame with a time-varying voltage or electrical charge; and
supporting an electrically isolated electrical conductor adjacent to the flame to cause the flame to emit at least one of enhanced visible or infrared light energy.

40. The method for radiating energy from a flame of claim 39, wherein providing the hydrocarbon fuel includes providing a gaseous hydrocarbon fuel.

41. The method for radiating energy from a flame of claim 39, wherein providing the hydrocarbon fuel includes providing a hydrocarbon gas fuel having one to three carbon atoms per molecule.

42. The method for radiating energy from a flame of claim 39, further comprising premixing all or a portion of the hydrocarbon fuel with air, oxygen, or other oxidizer.

43. The method for radiating energy from a flame of claim 39, wherein the flame includes a diffusion flame.

44. The method for radiating energy from a flame of claim 39, wherein energizing the flame with a time-varying voltage or electrical charge includes driving a first electrode near or at least partially in the flame with a corresponding time varying voltage.

45. The method for radiating energy from a flame of claim 39, wherein energizing the flame with a time-varying voltage or electrical charge includes driving a fuel nozzle or a flame holder with a corresponding time varying voltage.

46. The method for radiating energy from a flame of claim 39, wherein energizing the flame with a time-varying voltage or electrical charge includes driving an ionizer with the time-varying voltage to create the corresponding time-varying electrical charge.

47. The method for radiating energy from a flame of claim 39, wherein energizing the flame with a time-varying voltage or electrical charge includes driving an ion-ejecting electrode with the time-varying voltage to eject ions corresponding time-varying voltage or electrical charge toward or onto the flame.

48. The method for radiating energy from a flame of claim 39, wherein energizing the flame with a time-varying voltage includes energizing the flame with a voltage having a 50 to 10,000 hertz frequency.

49. The method for radiating energy from a flame of claim 48, wherein energizing the flame with a time-varying voltage includes energizing the flame with a voltage having a 50-1000 hertz frequency.

50. The method for radiating energy from a flame of claim 39, wherein energizing the flame with a time-varying voltage includes energizing the flame with a square wave.

51. The method for radiating energy from a flame of claim 39, wherein energizing the flame with a time-varying voltage includes energizing the flame with a sine wave.

52. The method for radiating energy from a flame of claim 39, wherein energizing the flame with a time-varying voltage includes energizing the flame with a 1000 volt to 115,000 volt amplitude.

53. The method for radiating energy from a flame of claim 39, wherein energizing the flame with a time-varying voltage includes energizing the flame with 8000 to 40,000 volt amplitude.

54. The method for radiating energy from a flame of claim 39, further comprising:
providing a flame energization geometry or control circuitry to substantially prevent electrical arcing.

55. The method for radiating energy from a flame of claim 39, wherein the electrical conductor is in electrical continuity with ground through a resistance greater than about one mega-ohm.

56. The method for radiating energy from a flame of claim 39, wherein the electrical conductor is insulated from ground.

57. The method for radiating energy from a flame of claim 39, wherein the electrical conductor is allowed to electrically float.

58. The method for radiating energy from a flame of claim 39, wherein the electrical conductor is in capacitive communication with the energized flame.

59. The method for radiating energy from a flame of claim 39, wherein the electrical conductor is in inductive communication with the energized flame.

60. The method for radiating energy from a flame of claim 39, wherein the electrical conductor includes a ring surrounding an upper portion of the flame and is in at least intermittent contact with the flame.

61. The method for radiating energy from a flame of claim 39, wherein supporting an electrical conductor adjacent to the flame to cause the flame to emit enhanced visible or infrared light energy includes shifting a reaction path to at least temporarily produce soot; and
wherein the soot emits black body radiation.

62. The method for radiating energy from a flame of claim 39, wherein supporting an electrical conductor adjacent to the flame to cause the flame to emit enhanced visible or infrared light energy includes increasing the emissivity or luminosity of reaction products and reaction intermediates in the flame.

63. The method for radiating energy from a flame of claim 39, further comprising:
transmitting at least a portion of the radiated energy to a heated apparatus.

* * * * *